United States Patent
Calaway et al.

(10) Patent No.: US 7,124,939 B2
(45) Date of Patent: Oct. 24, 2006

(54) METHOD AND APPARATUS FOR CREATING A BAR CODE

(75) Inventors: Douglas Calaway, St. Cloud, FL (US); Jason Kotte, St. Cloud, FL (US)

(73) Assignee: Tri Ventures Inc., Savannah, GA (US)

( * ) Notice: Subject to any disclaimer, the term of this patent is extended or adjusted under 35 U.S.C. 154(b) by 0 days.

(21) Appl. No.: 10/638,271

(22) Filed: Aug. 9, 2003

(65) Prior Publication Data

US 2004/0073495 A1    Apr. 15, 2004

Related U.S. Application Data

(60) Provisional application No. 60/402,352, filed on Aug. 9, 2002.

(51) Int. Cl.
*G06K 15/00* (2006.01)
*G06Q 30/00* (2006.01)

(52) U.S. Cl. ............ 235/383; 235/378; 235/381; 705/26; 705/27

(58) Field of Classification Search ............ 705/26, 705/27, 14, 21, 40, 64; 235/383, 385, 462.01, 235/381, 378
See application file for complete search history.

(56) References Cited

U.S. PATENT DOCUMENTS

| | | | | |
|---|---|---|---|---|
| 5,319,542 A * | 6/1994 | King et al. | ................. | 705/27 |
| 5,380,993 A * | 1/1995 | Komai | ................. | 235/462.01 |
| 5,768,384 A * | 6/1998 | Berson | ................. | 705/50 |
| 5,890,137 A * | 3/1999 | Koreeda | ................. | 705/26 |
| 6,023,683 A * | 2/2000 | Johnson et al. | ................. | 705/26 |
| 6,032,130 A * | 2/2000 | Alloul et al. | ................. | 705/27 |
| 6,055,516 A * | 4/2000 | Johnson et al. | ................. | 705/27 |
| 6,070,798 A * | 6/2000 | Nethery | ................. | 235/462.01 |
| 6,072,481 A * | 6/2000 | Matsushita et al. | ................. | 707/102 |
| 6,298,332 B1 * | 10/2001 | Montague | ................. | 705/27 |
| 6,324,525 B1 * | 11/2001 | Kramer et al. | ................. | 705/40 |
| 6,505,172 B1 * | 1/2003 | Johnson et al. | ................. | 705/27 |
| 6,578,012 B1 * | 6/2003 | Storey | ................. | 705/14 |
| 6,658,464 B1 * | 12/2003 | Reisman | ................. | 709/219 |
| 6,742,809 B1 * | 6/2004 | Frosig et al. | ................. | 281/21.1 |
| 6,745,186 B1 * | 6/2004 | Testa et al. | ................. | 707/7 |
| 2001/0037373 A1 * | 11/2001 | Cambridge | ................. | 709/217 |
| 2002/0069166 A1 * | 6/2002 | Moreau et al. | ................. | 705/40 |
| 2002/0111877 A1 * | 8/2002 | Nelson | ................. | 705/26 |
| 2002/0120519 A1 * | 8/2002 | Martin et al. | ................. | 705/21 |
| 2002/0120529 A1 * | 8/2002 | Buettgenbach et al. | ................. | 705/26 |
| 2002/0138369 A1 * | 9/2002 | Calaway et al. | ................. | 705/27 |
| 2002/0147656 A1 * | 10/2002 | Tam et al. | ................. | 705/26 |

(Continued)

FOREIGN PATENT DOCUMENTS

JP    08235206 A  *  9/1996

(Continued)

*Primary Examiner*—Daniel Walsh
(74) *Attorney, Agent, or Firm*—Nixon & Vanderhye P.C.

(57) ABSTRACT

A process and article of manufacture for ordering items. Descriptive item information is provided to a consumer on a mass media storage device. The consumer reviews the item information and selects items for purchase. During a check out process a textual order form and bar code, both including order information, are generated. The bar code is applied to the order form and both are transmitted to a vendor via mail, facsimile; upon receipt the vendor reads the bar code to enter the order information. Alternatively, the order information is electronically transmitted to the vendor, in which case it is not necessary to generate the bar code containing the order information.

20 Claims, 2 Drawing Sheets

U.S. PATENT DOCUMENTS

2002/0165800 A1* 11/2002 Ogura et al. ................... 705/27
2002/0184115 A1* 12/2002 Mueller et al. ................ 705/27
2002/0188524 A1* 12/2002 Shimizu ...................... 705/26
2002/0188525 A1* 12/2002 Terada ........................ 705/26
2002/0198788 A1* 12/2002 Moskowitz et al. ........... 705/26
2003/0033316 A1* 2/2003 Morgan, III ................ 707/100
2003/0139976 A1* 7/2003 Hanai et al. .................. 705/26
2003/0140007 A1* 7/2003 Kramer et al. ................ 705/40
2003/0144903 A1* 7/2003 Brechner et al. ............. 705/14
2003/0144923 A1* 7/2003 Capozzi et al. ............... 705/26
2003/0195805 A1* 10/2003 Storey ......................... 705/14
2003/0200120 A1* 10/2003 Binkert .......................... 705/3
2003/0225609 A1* 12/2003 Klipfell, III ................. 705/10
2004/0024646 A1* 2/2004 Iry et al. ...................... 705/26
2004/0073495 A1* 4/2004 Calaway et al. .............. 705/26
2004/0103065 A1* 5/2004 Kishen et al. ................ 705/64
2004/0117249 A1* 6/2004 Wang et al. .................. 705/14
2004/0153369 A1* 8/2004 Bencak ........................ 705/26
2004/0181454 A1* 9/2004 Manno ........................ 705/21
2004/0236631 A1* 11/2004 Graham ....................... 705/17
2005/0033599 A1* 2/2005 Frantz et al. ................... 705/1
2005/0033658 A1* 2/2005 Takeuchi et al. .............. 705/26
2005/0038712 A1* 2/2005 Veeneman .................... 705/26
2005/0049961 A1* 3/2005 Hansen ........................ 705/38

FOREIGN PATENT DOCUMENTS

JP          10222566 A    *   8/1998

* cited by examiner

METHOD AND APPARATUS FOR CREATING A BAR CODE

This patent application claims the benefit of the provisional patent application entitled Method and Apparatus for Creating a Bar Code filed on Aug. 9, 2002 and assigned application No. 60/402,352.

FIELD OF THE INVENTION

The present invention relates generally to the purchasing of goods and services, and more specifically to the purchasing of goods and services presented to the consumer in the form of data on a mass storage device and the creation of an order form for the purchase.

BACKGROUND OF THE INVENTION

Now that computers and their associated components such as compact disk readers, printers and Internet connections have become ubiquitous, consumers are afforded several new and different options for purchasing goods and services. Internet shopping, through so-called "e-businesses," allows a consumer to shop from the comfort of her living room. The consumer simply logs on to the e-business site through an Internet connection, browses the virtual store, makes selections and loads them into a virtual shopping cart. When the consumer is finished he/she proceeds to the virtual checkout counter. The cost of the goods and services are tallied, applicable tax, shipping and handling charges are added to the purchase, and the consumer pays for the transaction by providing a credit card number. Once the seller authorizes the charge card purchase, the consumer is so advised and the transaction is completed.

There are at least two difficulties associated with an e-business purchase. First, the rate at which the entire shopping experience occurs is directly related to the speed of the consumer's Internet connection. Today, 56 kilobyte (kB) modems operating over the standard telephone line are the most common route to the Internet. Faster connections such as XDSL and cable modems offer faster data rates, but they are employed by only a minority of the e-commerce consumers. The transmission data rate is the system bottleneck as it directly affects the speed at which the consumer can proceed through the transaction. Because of this data bottleneck, e-business sites selling products or services that require the display of extensive information to the consumer during the purchasing process are likely to create frustrated buyers. For example, the sell of clothing items likely requires the consumer to process through hundreds of styles and colors before a selection can be made. A slow data transfer rate (where slow is defined as the rate that causes the consumer to lose interest and terminate the purchase process before completing the transaction) dooms the transaction. Even the fastest data rates may not be fast enough for the busy consumer shopping at a well-stocked Internet-site store.

There is also the well-known problem of credit card fraud associated with Internet transactions. Most consumers are now accustomed to and have accepted the need to provide a credit card number when placing a telephone order. But there is still considerable hesitancy when the computer prompts the consumer to enter a credit card number, after which the number will travel through the unbridled Internet. Surveys have shown that at least 50% of consumers prefer either to send their order through the mail or fax it to the vendor, thus avoiding sending their credit card number over the Internet.

SUMMARY OF THE INVENTION

An article of manufacture is taught, comprising a computer program product further comprising a computer readable medium having a computer readable code therein for ordering items from a vendor. The computer readable code comprises a computer readable program code module storing information associated with the items, a computer readable program code module for receiving order information for one or more of the items and a computer readable program code module for generating a bar code in response to the order information. In another embodiment, the bar code is not generated and instead the order is electronically provided to the vendor.

A method according to the present invention for ordering items from a vendor wherein item information is stored on a mass storage medium, comprises retrieving the item information from the mass storage medium onto a computer and identifying one or more of the items for purchasing. The purchaser enters order information into the computer. An order form comprising the order information is generated in response to the order information and transmitted to the vendor.

BRIEF DESCRIPTION OF THE DRAWINGS

The foregoing and other features of the present invention will be apparent from the following more particular description of the invention as illustrated in the accompanying drawings, in which like reference characters refer to the same parts throughout the different figures and text. The drawings are not necessarily to scale, emphasis instead being placed upon illustrating the principles of the invention.

DETAILED DESCRIPTION OF THE INVENTION

Figure 1:
FIGS. 1 and 2 illustrate bar codes for use with the present invention.

Before describing in detail the particular method and apparatus for order items from a vendor in accordance with the present invention, it should be observed that the present invention resides in a novel and non-obvious combination of elements and process steps. Accordingly, the elements have been represented by conventional elements in the drawings, showing only those specific details that are pertinent to the present invention so as not to obscure the disclosure with details that will be readily apparent to those skilled in the art having the benefit of the description herein.

According to the teachings of the present invention, one computer-based alternative to purchasing goods and services over the Internet provides the virtual store in the form of an article of manufacture comprising data and software code on a compact disk (CD). The consumer loads the CD into the computer's compact disk bay and the store is open—day or night. Data is transferred between the disk drive and the computer at much faster rates than Internet download and upload date rates.

Data/information in many different formats is stored on the CD to enhance the shopping experience and provide the consumer with additional detailed information to promote a more-informed buying decision. The CD is essentially an electronic catalog of merchandise, an ordering module, and/or a catalog module, offered by the vendor, with the merchandise information is provided in considerably more detail than a paper catalog. For example, short audio/video segments from recorded movies can be viewed before the movie is purchased. To entice customers, to use the CD, certain sale items can be made available only on the CD and not at a retail outlet or an internet site. Furthermore, the CD can contain non-product information related to the items for sale. For example, a CD containing NASCAR products can include race and driver statistical information that would be of interest to a NASCAR fan. Thus the CD has value apart from its electronic catalog function. In another embodiment, NASCAR product CD's can be formed in the shape of a trading card to create additional intrinsic consumer value in the CD.

The data-intensive, multi-media information stored on the CD can be displayed from a CD in seconds, where the Internet date transfer for the same quantity of information can take minutes, typically beyond the consumer's patience limit. Also, shopping at the CD store eliminates transmittal of the consumer's credit card number over the Internet. Once the CD content has been created by the vendor, an unlimited number of CD's with the content stored thereon can be manufactured at a marginal cost of pennies. In fact, the CD cost is so low, that they can be given to consumers at no charge. There remains however, the need for an efficient and accurate process for capturing the consumer's order and transmitting it and related necessary information to a site where the order can be filled and the goods shipped to the consumer.

According to the teachings of the present invention, the virtual store CD is equipped with self-sufficient software for controlling the viewing and purchasing process. That is, there is no requirement for computer-resident plug-ins, scripts or applets. The CD provides all the software that is required for placing the order; an important convenience for the consumer. By eliminating the need for special computer-resident software, the CD shopping experience is available to anyone with a computer and a CD reader, which now includes a considerable segment of the population.

The Cd shopping experience begins with the consumer perusing the items available for sale on the CD, including drilling down through additional data screens to access more detailed information for a product. Once the consumer has decided to purchase an item, she/he follows the instructions for adding the item to her/his virtual shopping cart. When she/he has finished shopping, the consumer moves to the check-out process, reviewing the items purchased, providing, to a customer information receiving module and/or an ordering module, shipping information, credit card number, etc. But note that the consumer does not have an active Internet connection during this process; the computer accesses data only from the CD and the computer's random access memory.

All the information required to fill the order, including items, quantity, price, credit card number, etc. is included on the order form. Additionally, according to one embodiment of the present invention, this information is also recorded on the order form in the form of a bar code, which is created with a encoding module and/or software resident on the CD. After completing the order form, the consumer is presented with a number of alternatives for supplying the order to the vendor. Selection boxes appear on the display screen allowing the consumer to submit the order electronically, by facsimile or by mail. Consumers who are reluctant to release their credit card information over the Internet are thus provided with the facsimile and mail alternatives for placing the order.

If the facsimile option is selected, the order form, with the bar code disposed therein, is printed, by direction from a printing module, in faxable-form, including the receiving facsimile telephone number, if the mail option is selected, an order form and envelope are printed by direction from a printing module, (with the bar code printed on the order form), and the customer is prompted for additional print copies if he/she wishes to retain a copy. The customer then mails the order form to the vendor. If the customer selects the electronic transmittal option, he/she is automatically connected to the Internet and the order, including the credit card information, is transmitted to the vendor in encrypted form. This can be accomplished by sending the order as an email attachment or as a file sent directly to the vendor's database of orders.

During and after the ordering process, all the ordering information is stored only in the computer's random access memory. If the consumer elects to save the information, it is saved to a secure area on the computer hard drive under control of the software provided with the vendor's CD.

When the order form is received at the vendor's site (or the site of a third party order services provider), whether by fax, mail or electronically, the data must be entered into the vendor's ordering system. If the order form is electronically transmitted to the vendor, the order is electronically processed, an efficient and error-free process. The encrypted transmittal offers protection against credit card fraud.

According to the prior art, whenever a product order is transmitted to a vendor by mail or fax, the order entry process is conventionally accomplished by manual data entry of each character on the order form. The process is labor-intensive, slow and the likelihood of errors is high. To overcome these disadvantages, as described above according to the present invention, the order information is also presented on the order form as a bar code (preferably a two-dimensional bar code as known in the art). Upon receipt of the order form via fax or mail, the vendor scans the bar code with known bar code reading devices and all the order data is entered into the vendor's ordering system—immediately and without error.

Figure 2:

Single and two-dimensional bar codes are illustrated in FIGS. 1 and 2, respectively. Either can be employed according to the teachings of the present invention, although use of the one-dimensional bar code limits the amount of data that can be bar code encoded. Essentially, a two-dimensional bar code (also referred to as PDF 417 bar code, where PDF 417 is the industry standard describing the bar code attributes) is comprised of a plurality of one-dimensional bar codes that are compressed and stacked vertically. While this description is not representative of the process by which a two-dimensional bar code is designed, it does illustrate the two-dimensional nature of the bar code. The extra dimension of the two-dimensional bar code allows it to pack significantly more information into the same physical space as occupied by a one-dimensional bar code. This is possible because a single PDF 417 bar code can include up to 90 rows with 30 symbols per row. Thus approximately 2700 digits can be encoded per two-dimensional bar code image. If the digits are limited to text only, about 1800 ASCII characters can be encoded. Error detecting and correcting functions can also be added at the expense of additional data overhead, reducing the number of characters available for textual information. For example, a PDF 417 bar code can hold a total of about 1761 characters with an error correction rate of four. In yet another embodiment the order information is encrypted in the two-dimensional bar code to provide security for the order information.

Figure 3:
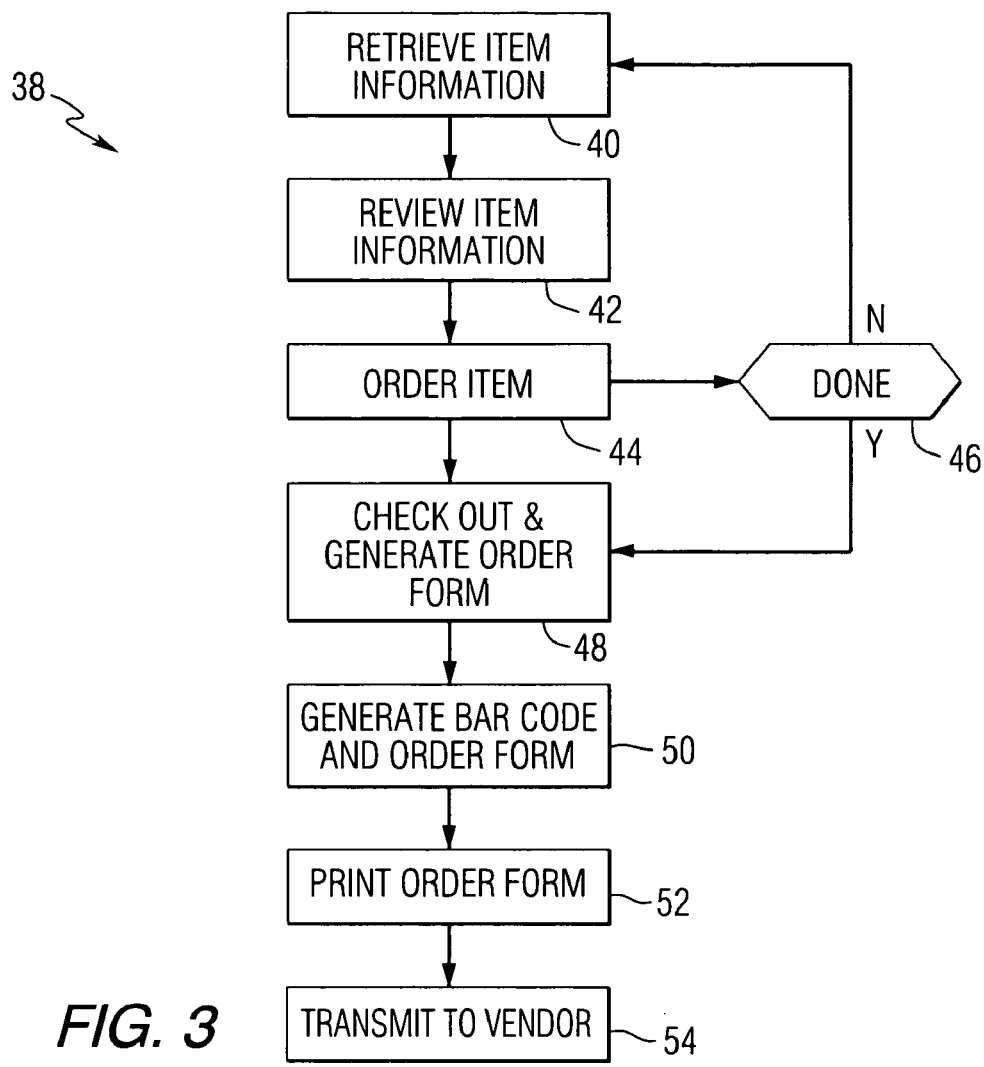
FIGS. 3 and 4 illustrate processes for ordering items according to various embodiments of the present invention.

FIG. 3 presents an exemplary flow chart of a process 38 for generating an order form and a two-dimensional bar code according to the teachings of the present invention. At a step 40 a consumer retrieves item information from the CD or other mass storage device such as a DVD (digital video disk) onto a computer monitor or data processing device display. Those skilled in the art recognize that other mass storage devices can be used according to the teachings of the present invention, including, but not limited to, flash memory devices, compact flash memory devices, memory sticks, zip disks and microdrives. The various steps of the process 38 are performed under control of a consumer's computer or other data processing device, but the necessary software instructions and other computer code is provided on the mass storage device for processing by the computer or data processing device to implement the steps of the process 38. Thus the consumer is not required to have any specific software programs resident on his computer.

The consumer reviews the item information at a step 42 and considers whether to purchase the item. When an item is ordered (a step 46) the item is added to a virtual shopping cart, including the particulars of the ordered item (e.g., size, quantity, price), collectively referred to as order information. The software program on the mass storage device codes the order information and stores it in the computer or data processing device. The coded data presents a text version of the order information in a predetermined format.

The process 38 loops through the decision step 46 and the steps 40 and 42, where the consumer retrieves and reviews additional item information as he ponders additional purchases. As he makes additional purchases, the new order information is associated with the previous order information and stored until checkout. When the consumer has finished purchasing items the process exits the decision step 46 to a step 48 where the consumer checks out and an order form is generated. At checkout, the consumer adds his billing, shipping and credit card information, which is also coded by the software program. After the order information is complete, the coded data representative thereof is preferably compressed. In one compression scheme each text character is compressed by matching with a byte compressed equivalent using software resident on the CD. After compression, the information is correlated with the order form print format and also converted into a PDF 417 bar code. See a step 50. Other printable/scanable codes known to those skilled in the art, including other codes comprising bars or other characters, can be used in lieu of the PDF 417 bar code. The bar code is associated with the stored version of the text-based order form. Also, in one embodiment the bar code is encrypted.

At a step 52 the consumer prints the order form, which includes the text-based order information and substantially the same order information encoded into the bar code. At a step 54 the form is transmitted to the vendor, either by mail or facsimile. Error-free data entry at the vendor's site requires simply scanning the bar code with known bar code readers. Thus the order is entered error-free and the consumer has avoided entry of his credit card information through an Internet connection.

It is known to those skilled in the art that there are several bar code versions included within the PDF 147 bar code standard. As described above, one bar code version provides for 1761 characters with level four error correction. Another version provides the same number of characters in a single bar code, but allows chaining of single bar codes to accommodate more characters. According to one version, 99,999 of such single bar codes can be chained to support the required number of characters.

In another embodiment, the step 54 further comprises electronically transmitting the order form to the vendor. Preferably, in this embodiment the order information is encrypted (or the credit card information contained in the order form can be encrypted). Further, in this embodiment it is not necessary to create the bar code. Instead the order information is transmitted electronically and entered into the vendor's order processing system.

Figure 4:
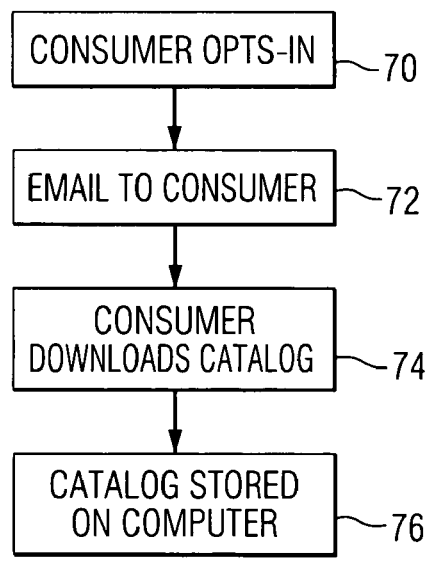

In yet another embodiment of the present invention a merchandise catalog is sent to a purchaser who has elected to "opt-in" to the service. See a step 70 of FIG. 4. A list of such consumers is retained by the merchandise vendor and an email, including a web site link from where the consumer can download the merchandise catalog, is sent to the consumers as indicated at a step 72. In one embodiment the catalog comprises a limited duration catalog that is updated by vendor. When the consumer downloads the catalog (step 74), software accompanying the catalog installs an associated software program on the consumer's computer and stores the catalog in the consumer's computer. See a step 76. Preferably, the software places a catalog icon on the computer desktop. Typically, the catalog includes a limited number of items, 50 for example to limit the download duration, especially for consumers accessing the web site over a relatively slow communications link. The catalog contains images and descriptive text information for each item in the catalog. When ordering from the catalog the purchaser enjoys all the options of the CD catalog process and article of manufacture as described above, including the bar code feature for the printed and faxed orders.

The catalog can be updated on the vendor's server at any time. Each time the catalog is opened from the consumer's desktop, the software determines if the consumer is connected to the Internet and if an Internet connection is available, checks whether the catalog has been updated. If a revised catalog is available, the software downloads and replaces the item information for all items revised from the previous catalog version.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A system for generating an order form for a customer, the system comprising:
   a catalog module including merchandise information;
   a customer information receiving module;
   an encoding module in data communication with the customer information receiving module; and
   a printing module in data communication with the encoding module and configured to provide printing instructions sufficient to generate an order form from customer information, the printing module and the encoding module cooperating to at least partially encode the order form, wherein the partially encoded portion of the order form comprises sufficient information to fill an order.

2. The system of claim 1, wherein the partially encoded order form includes a bar code.

3. The system of claim 2, wherein the bar code comprises a two dimensional bar code.

4. The system of claim 1, wherein the customer information includes a credit card number.

5. The system of claim 1, further comprising an encryption module configured to encrypt the customer information.

6. The system of claim 3, wherein the two-dimension bar code includes a credit card number.

7. The system of claim 1, further comprising a compression module configured to compress customer information.

8. The system of claim 1, wherein the customer information includes sufficient information to fill an order.

9. The system of claim 4, wherein the credit card number is encoded and is not printed in a human readable form on the partially encoded order form.

10. A method of receiving customer specific order information from a customer, comprising:
supplying the customer with an ordering module that enables the customer to actuate:
collecting customer specific order information including sufficient information to fill an order;
encoding the customer specific order information; and
providing instructions sufficient to print the encoded information in a scannable format; and
receiving the customer specific order information from the customer by:
scanning the customer encoded specific order information;
decoding the customer specific order information; and
populating a database with the decoded customer specific order information.

11. The method of claim 10, wherein the encoding step further comprises encoding the customer specific order information into a two-dimensional bar code according to a standard encoding schema.

12. The method of claim 11, wherein the ordering module further comprises enabling the customer to actuate encrypting the customer specific order information.

13. The method of claim 10, wherein the ordering module further comprises enabling the customer to actuate printing a substantial portion of the customer specific order information in a human readable format.

14. The method of claim 10, wherein the customer specific order information includes a credit card number.

15. The method of claim 10, wherein the ordering module further comprises a catalog of merchandise.

16. The method of claim 13, wherein the customer specific order information includes a credit card number and the substantial portion of the customer specific order information does not include the credit card number.

17. The method of claim 10, wherein the ordering module further comprises enabling the customer to actuate compressing the first information portion.

18. The method of claim 16, wherein the ordering module further comprises enabling the customer to actuate encrypting the credit card number.

19. An article of manufacture, comprising a program storage medium readable by a processor and embodying one or more instructions executable by the processor to perform a method for generating a partially encoded order form for a customer, the method comprising:
presenting a catalog of merchandise to the customer;
collecting customer specific order information related to an order of merchandise from the catalog, the customer specific order information including sufficient information to fill an order;
encoding the customer specific order information, thereby forming a coded portion; and
printing at least the coded portion, thereby forming a partially encoded order form.

20. A method of processing an order via computer access to a storage medium and without Internet access, the method comprising:
providing the storage medium to a customer, the storage medium storing a complete catalog of merchandise without requiring Internet access;
compiling customer specific order information related to an order of merchandise from the catalog;
encoding at least a portion of the customer specific order information;
printing at least the encoded portion of the order form;
receiving the printed order form; and
decoding the encoded portion of the order form.

* * * * *